United States Patent Office 3,541,783
Patented Nov. 24, 1970

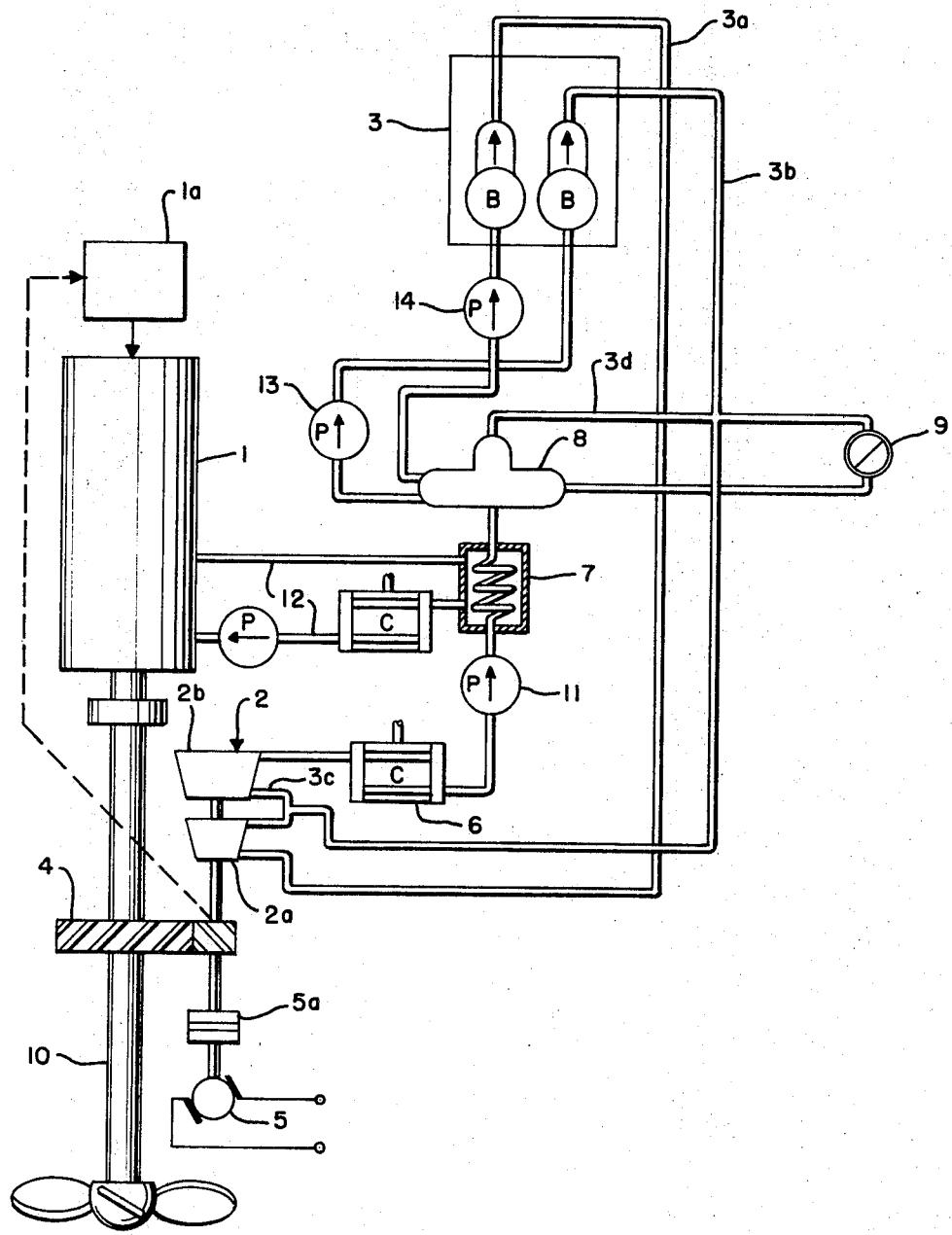

3,541,783
COMBINED DRIVE ENGINE SYSTEM FOR SHIPS
Peter Schmuck, Rostock, Germany, assignor to VEB Warnowwerf Warnemunde, Warnemunde, Germany
Filed Sept. 25, 1968, Ser. No. 762,499
Int. Cl. F01k 23/14
U.S. Cl. 60—11                                       1 Claim

ABSTRACT OF THE DISCLOSURE

An I.C. engine and a steam turbine driving a common propeller shaft. The I.C. engine operates near to its full load and delivers greater part of driving power, whereas the turbine at normal travel speed rate of the ship drives simultaneously a disconnectable electrical generator for board use. The exhaust gas from the I.C. engine is utilized for the steam production in the steam generator of the turbine.

BACKGROUND OF THE INVENTION

In drive systems for ships there have usually been employed internal combustion engines, steam turbines, gas turbines, or combinations thereof.

The I.C. engine is a power generating machine which due to its pulsating mode of operation makes it possible to transform heat at high temperatures and which in cooperation with exhaust gas turbine attains the highest efficiency of all known heat transforming power machines. The exhaust gas turbine which drives the supercharger utilizes thereby about 20–50% of the temperature gradient which, according to the present state of the art, can be attained at .6 to .7 output efficiency of the turbine whereas the remaining 80–50% of the temperature gradient can be utilized only insufficiently.

When an I.C. engine is employed as the sole drive means for the ship then, especially in the case of freighters for piece goods which are driven during the greater part of their operative time at standard travel speed rate, a disadvantage results residing in that the ship utilizes about 77% of its possible operative power (dependent, e.g., on loading condition of the ship) and the motor thereof is running mostly at partial load operative condition. The parts of the motor are consequently exposed to increased wear in comparison with the full load operation because of more intensive fouling and corrosion thereof. At the same time the quality of the exhaust heat diminishes and its economic value becomes problematic.

Moreover, there is no possibility to exploit completely the power reserve of the I.C. engine during the ship voyage, which otherwise could be employed for the production of electrical energy for the board application, for example.

The drive systems for ships with steam turbines do not attain the efficiency of those of I.C. engines since the continuous combustion in the steam generator makes it necessary to employ relatively low temperatures for the heat transfer.

Nevertheless, the steam engine has a favorable partial load operation and by contrast to I.C. engines a more favorable overload characteristic. It is also an advantage of the steam turbine system that the continuous combustion process can be better controlled and that the heat energy both of the exhaust gas and of the steam can be utilized at relatively low temperatures.

There are also known drive engine systems for ships which consist of steam turbines combined with I.C. engines or gas turbines to drive a common drive propeller shaft.

The output of respective driving machines in these known systems is divided so that the steam engine delivers the main portion of the driving energy and for this reason it is the determinative factor for the efficiency of the entire system. In accordance with various speed conditions of the ship the I.C. engine operates mostly in the region of partial load so that the aforementioned disadvantages such as fouling of motor parts and poor exhaust gas quality will occur again.

Accordingly, the object of the present invention is to substantially improve the effective power of ship's driving systems. More particularly the object of the present invention is to create a combination of an I.C. engine with a steam turbine such that will increase total efficiency of the drive system.

SUMMARY OF THE INVENTION

According to this invention the above object is attained so that an I.C. engine and a steam turbine cooperate for driving a common driving shaft whereby the main portion of the driving energy is delivered by the I.C. engine.

At the same time the maximum power of the I.C. engine is designed with respect to the most important travel speed rates of the ship so that the engine may operate near to its full load, that is, in its most favorable operational region.

The output of the steam engine on the other hand is adjusted so that during normal travel speed the turbine operates in partial load region whereby a portion of the generated power is imparted to the drive shaft and the remaining portion thereof is employed for driving one or more electric generators producing electric energy for board consumption.

Consequently, it is possible to exclude separately driven diesel engine generators (except one emergency generator) which until now have been necessary. If the full driving power is required, for example in the case of high speed travel or of fully loaded ship, the steam turbine will operate in overload region. In the latter mode of operation the generator is disconnected from the steam engine and the energy supply for the board consumption is provided by the emergency diesel engine generator.

By the aid of the above described combination of an I.C. engine and a steam turbine and due to the novel drive power distribution on the drive shaft it is attained that the optimum operative region for the I.C. engine is determinative for the total efficiency of the drive engine system of this invention. Since the steam engine during the most frequent travel speeds is utilized also for production of electrical energy for the board application and since it can be employed for operation in the overload region to produce full driving output when necessary whereby the energy diesel-engine generator takes over the electric energy supply, the emergency power reserve by contrast to known drive engine systems can be substantially reduced.

Owing to the fact that the I.C. engine operates mostly near to or at the full load region the good quality of motor exhaust gases is maintained and, consequently, it is possible to utilize in the most economical way the heat energy of the latter. The temperature of the oxygen containing exhaust gases can be further increased by combustion thereof with heating oil with or without supply of fresh air. As a result the total efficiency of the drive system according to this invention substantially exceeds the efficiency of the drive systems known from prior art.

In another embodiment of this invention the exhaust gas energy of the I.C. engine is, by contrast to conventional arrangement, utilized, not for driving a supercharger by the aid of an exhaust gas turbine, but directly in the steam generator for the steam turbine. The superchargers for the I.C. engine are driven by the steam turbine or when the latter is out of action by the I.C. engine itself. As a result, a thermodynamically favorable utilization of the total exhaust gas energy of the I.C.

engine is attained and, therefore, a further increase in the efficiency of the entire system.

Moreover, the drive of the supercharger by means of the steam turbine which by contrast to the exhaust gas turbine has a higher power output provides consequently better equalization of loads and has a positive effect.

Furthermore, it is possible to provide the drive engine system of this invention with additional I.C. engines and steam turbines.

BRIEF DESCRIPTION OF THE DRAWING

The invention will become more readily apparent from a description of a preferred embodiment thereof shown in the accompanying drawing, in which the single figure shows schematically a diagram of the drive engine systems for ships according to the present invention.

With reference to the figure, the drive engine system comprises an internal combustion (I.C.) engine 1 and a steam turbine 2 having a high-pressure stage 2a and a low-pressure stage 2b, which by means of transmission gear 4 drive a common propeller shaft 10. The high-pressure and low-pressure steam is generated in a steam generator boiler 3. The overheated high-pressure steam is supplied to the high-pressure stage 2a of the steam turbine 2 through high-pressure steam conduit 3a and the low-pressure stage 2b is energized through conduit 3c by the steam from the high-pressure stage on the one hand and through the conduit 3b by the low-pressure steam from the steam generator boiler 3 on the other hand. The exhaust steam from the low-pressure stage 2b is fed to a condenser 6 wherefrom the condensate is pumped out by means of a pump 11 into a preheater 7 to be heated by the cooling water conduits 12 of the I.C. engine. From the preheater 7 the heated condensate is further supplied into a steam or gas expeller 8 which is connected through the conduit branch 3d with the low-pressure steam conduit from the steam generator boiler 3. The degasified water in the expeller 8 is fed by means of pumps 13 and 14 into respective high-pressure or low-pressure sections of the steam generator boiler 3.

The exhaust gases from the I.C. engine are in this particular embodiment applied directly into the boiler 3 to support combustion process therein for generation of the steam.

The steam turbine 2 is disconnectably coupled by means of a coupling 5a with an electric generator 5 which generates electrical energy for the electrical appliances located aboard. Besides, steam consumers 9 on the board are energized by the low-pressure steam from the boiler 3.

The conventional devices for controlling, regulating and switching-over of the exhaust gases, heating oil supply, steam pressure control, temperature control, governor of the weight velocity of flow as well as the engine or machine system controlling devices are for the reason of simplicity not shown in the diagram.

Let us assume that the maximum driving power of the illustrated engine system is, for example, 20,000 HP. In accordance with one characteristic feature of the present invention the full load of the I.C. engine 1 is selected to be 13,300 HP. and that of the steam turbine 2 to be 4,600 HP whereby the required power for the board consumption amounts to 1,100 HP.

For a standard travel speed rate of the ship there is required approximately 77% of the maximum driving power, i.e., about 15,400 HP. The I.C. engine delivers at that normal speed rate 12,600 HP which power corresponds to about 95% of the full load of the I.C. engine. The steam turbine delievers the remaining 2,800 HP for co-driving the propeller shaft and also said 1,100 HP for driving the generator 5 for the board consumers. Consequently, the load of the turbine amounts to about 83%.

Due to the fact the supercharger 1a which is necessary for feeding the I.C. engine is also driven by the turbine 2, the load of the latter becomes still more increased.

Provided that full driving power (20,000 HP) for the ship is required, which requirement occurs relatively seldom in practice, then the I.C. engine 1 is overloaded by about 5% and the steam engine by about 30%. In this case the I.C. engine supplies about 14,000 HP and the steam turbine about 6,000 HP whereas the generator 5 is disconnected from the turibne and the electric energy supply for the board network is carried out by an emergency diesel-engine generator, independently from the drive engine system.

Therefore, during the normal travel speed rate, the I.C. engine supplies approximately 82% and during the full load theerof about 70% of the total driving power whereby it permanently works near to the full load point and the thermal energy of exhaust gases is for this reason permanently increased.

As a result, the drive engine system of the present invention has high effective power and can be permanently maintained at optimum working condition by controlling loads of respective engines.

What is claimed is:

1. A power plant for a ship, comprising an output shaft, at least one internal combustion engine and at least one steam turbine, each of said internal combustion engines and each of said steam turbines being operatively connected to said shaft to drive the shaft, said internal combustion engines having a total nominal capacity approximately equal to the capacity required when the ship is operating with a normal load and at normal speed whereby normally said internal combustion engines operate at approximately nominal capacity and said power plant having a total nominal capacity lower than the capacity required when the ship is operating heavily loaded and at maximum speed whereby under the latter conditions the steam turbines operate at above their nominal capacity.

References Cited

UNITED STATES PATENTS

| | | | |
|---|---|---|---|
| 992,780 | 5/1911 | Kitchen | 60—11 |
| 1,339,177 | 5/1920 | Dyer | 60—11 |

FOREIGN PATENTS

| | | |
|---|---|---|
| 578,147 | 6/1946 | Great Britain. |
| 743,037 | 1/1956 | Great Britain. |

EDGAR W. GEOGHEGAN, Primary Examiner